United States Patent [19]

Green et al.

[11] Patent Number: 5,006,249

[45] Date of Patent: * Apr. 9, 1991

[54] ANAEROBIC WASTE WATER TREATING PROCESS

[75] Inventors: George A. Green, Elizabeth; Stanislaus A. Kaczmarek, Morris Plains, both of N.J.

[73] Assignee: Exxon Research and Engineering Company, Florham Park, N.J.

[*] Notice: The portion of the term of this patent subsequent to Jan. 8, 2008 has been disclaimed.

[21] Appl. No.: 290,402

[22] Filed: Dec. 29, 1988

[51] Int. Cl.$^5$ .................................................. C02F 3/28
[52] U.S. Cl. ............................. 210/603; 48/197 A; 210/615; 210/617; 210/631; 435/167
[58] Field of Search ............... 210/603, 605, 609, 610, 210/611, 612, 613, 615, 616, 617, 631; 435/167; 48/197 A

[56] References Cited

U.S. PATENT DOCUMENTS

| | | |
|---|---|---|
| 4,315,823 | 2/1982 | Witt et al. .......................... 48/197 A |
| 4,351,729 | 9/1982 | Witt ..................................... 210/603 |
| 4,614,587 | 9/1986 | Andersson et al. .................. 435/165 |
| 4,632,759 | 12/1986 | Andersson et al. .................. 435/167 |

*Primary Examiner*—Peter Kratz
*Attorney, Agent, or Firm*—Chris P. Konkol; Roy J. Ott

[57] ABSTRACT

Waste water comprising organic pollutants, a Group II A metal component and a high concentration of an alkali metal component, such as produced water, is treated with an acclimated biomass of anaerobic microorganisms to decompose the organic pollutants to carbon dioxide and methane.

11 Claims, 1 Drawing Sheet

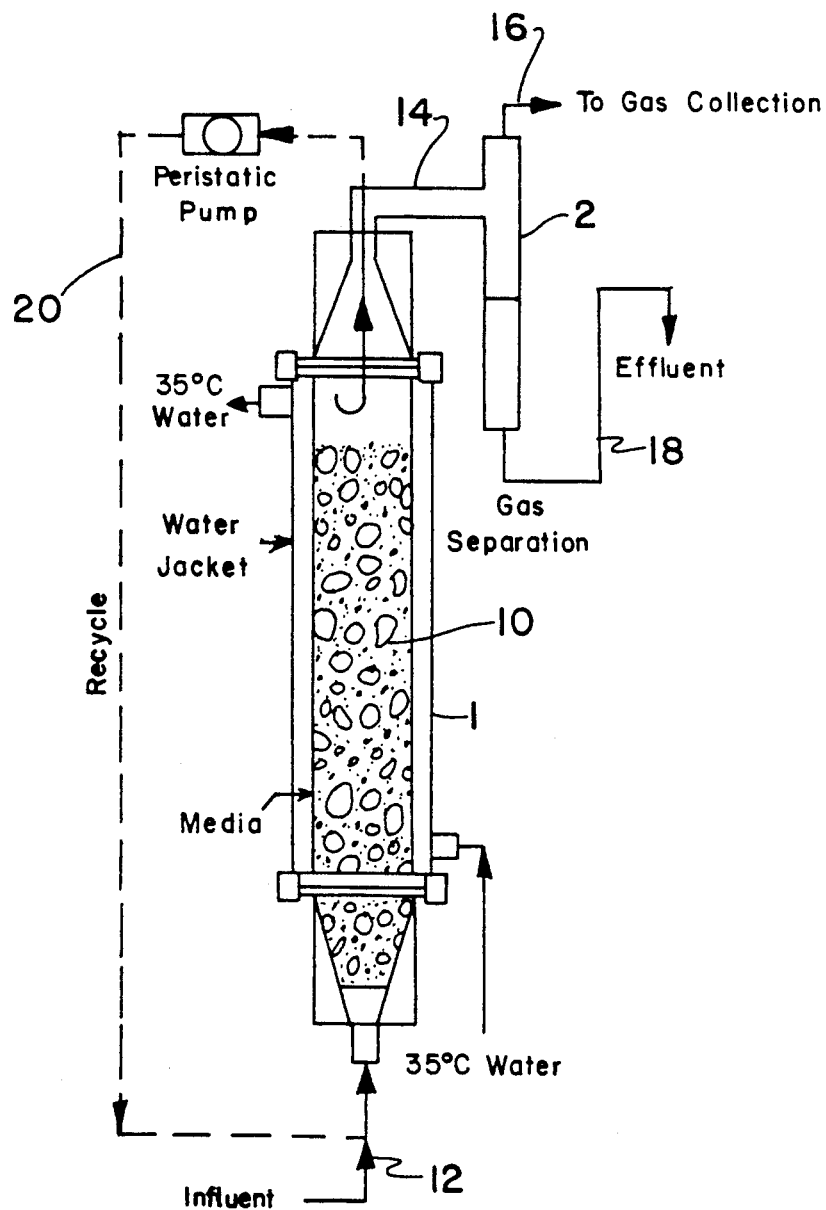

ANAEROBIC WASTE WATER TREATING PROCESS

BACKGROUND OF THE INVENTION

1. Field of the Invention

This invention relates to a waste water treating process using a biomass of anaerobic microorganisms.

2. Description of Information Disclosures

Anaerobic processes are known for treating waste water containing organic pollutants to decompose the organic pollutants to carbon dioxide and methane and, thereby, produce a treated waste water which is environmentally acceptable.

U.S. Pat. No. 4,351,729 discloses subjecting waste water containing organic pollutants to anaerobic biological treatment.

U.S. Pat. No. 4,315,823 discloses adding an alkaline material such as sodium hydroxide to an anaerobic filter for treatment of acidic waste water to neutralize the acids. The proportion of sodium ion in the total feed to the anaerobic filter is usually not above 4 g/l (i.e., 4000 mg/l).

It has been disclosed that sodium inhibits anaerobic microorganisms. See, for example, McCarty and McKinney "Volatile Acid Toxicity in Anaerobic Digestion", Journal of Water Pollution Control Fed., Vol. 33, No. 3, pages 223-232, 1961; and Kugelman and Chin, "Toxicity, Synergism and Antagonism in Anaerobic Waste Treatment Processes", Advances in Chemistry Series V.105, American Chemical Society, 1971.

It has now been found that waste water comprising organic pollutants and a high concentration of salts, such as water separated from crude oil at the production well, may be treated with a biomass of anaerobic microorganisms to decompose the organic pollutants while minimizing the inhibition of the microorganisms, if the microorganisms are preconditioned to these salts prior to contacting the microorganisms with the waste water comprising the high concentration of salts.

SUMMARY OF THE INVENTION

In accordance with the invention there is provided, a process for treating water comprising organic pollutants, a Group II A metal component of the Periodic Table of Elements, and a high concentration of an alkali metal component, which comprises: contacting said water, in a contacting zone, in the absence of added molecular oxygen, with an acclimated biomass of anaerobic microorganisms at conditions to convert at least a portion of said organic pollutants to carbon dioxide and methane.

The Periodic Table of Elements referred to herein is given in *Handbook of Chemistry and Physics* published by the Chemical Rubber Publishing Co., Cleveland, Ohia, 45th Edition, 1964.

BRIEF DESCRIPTION OF THE DRAWING

The FIG. is a schematic representation of a laboratory apparatus for conducting anaerobic experiments.

DETAILED DESCRIPTION OF THE INVENTION

A biomass of the anaerobic microorganisms is either acclimated before being introduced into a conversion zone suited for the biological conversion of organic pollutants to gases or it is acclimated in situ in the biological conversion zone. Anaerobic microorganisms for waste water treatment are commercially available. The acclimatization is performed by contacting the biomass, in the absence of added oxygen, with water comprising organic pollutants, a Group II A metal component and a low concentration of an alkali metal component. Additional amounts of alkali metal component are introduced into the water stream to increase the concentration of the alkali metal component until it reaches the concentration of the water to be treated in a subsequent stage. Preferably, additional amounts of the Group II A metal component and the organic pollutants are also introduced incrementally with the added alkali metal component. Suitable alkali metal components are salts of sodium, potassium, lithium, cesium, rubidium and mixtures thereof, such as the chloride salts. Sodium and potassium components are preferred due to their cost, availability, and predominance in natural waters. Particularly preferred is sodium chloride. Suitable Group II A components are salts of magnesium, salts of calcium and mixtures thereof, such as salts present in sea water. Preferred Group II A metal components are magnesium chloride, calcium chloride and mixtures thereof. The biomass may also comprise a nutrient, such as acetic acid. The initial water stream in the acclimatization stage may comprise a concentration of alkali metal component ranging from about 500 to about 1000 mg/l, calculated as elemental metal, and from about 50 to about 100 mg/l of a Group II A component, calculated as elemental metal. Gradually, incremental amounts of alkali metal component are added at a rate of about 500 to 1000 mg/l per day. Preferably, additional amounts of Group II A metal components are also incrementally added when the incremental alkali metal component is being added. More preferably, organic pollutants are also incrementally added with the alkali metal component and with the Group II A metal component. The acclimatization may be conducted for time periods ranging from about 40 to about 80 days. Suitable temperature for the acclimatization stage may range from about 30 to about 40 degrees C., preferably from about 33 to about 37 degrees C. The pressures in the acclimatization zone is controlled by the gas collection apparatus and ranges typically from about 0 to about 5 psig. After the biomass of microorganisms has been acclimated to the alkali metal component and Group II A metal component to minimize the inhibiting effect (biocidal or biostatic) of high concentration of these compounds, the acclimated biomass is contacted with a waste water stream comprising organic pollutants, a Group II A metal component, and a high concentration of an alkali metal component. As stated previously, the biomass could have been acclimated prior to introducing it into the conversion zone or the biomass could be acclimated after being introduced into the conversion zone (i.e. in situ). In either embodiment, the acclimated biomass is contacted, in a conversion zone, with the waste water to be treated, in the absence of molecular oxygen, to convert at least a portion of the organic pollutants to carbon dioxide and methane. The waste water to be treated by the process of the present invention comprises an alkali metal component and a Group II A metal component. The alkali metal component is present in the water to be treated in an amount of at least about 7000 mg/l, typically at least 10,000 mg/l, and may range from about 7000 to about 20,000 mg/l, calculated as elemental metal. The Group II A metal component is present in the water to be treated in an amount of at least about 50 mg/l, and may range from about 50 to about 2000 mg/l, calculated a elemental metal. The alkali metal component is usually present predominantly as sodium chloride with a minor amount of potassium chloride. The Group II A metal component is usually present as the chloride, carbonate or sulfate of calcium and/or magnesium. The organic pollutants in the waste water to be treated include organic compounds such as hydrocarbons, organic acids, organic alcohols and mixtures thereof. The organic pollutants may be present in the waste water in an amount ranging from about 0.1 to about 2.0 wt %. The waste water stream may be derived from any source such as petroleum refining processes, petrochemical processes, food industry, etc. The process of the present invention is particularly suited to treat waste water derived by separating water from crude oil at a production well. Such water comprises a high concentration of salts generally present in sea water such as sodium chloride, magnesium compounds, calcium compounds, etc., hydrocarbonaceous oils and greases, and organic acids. The waste water stream separated from crude oil at a production well will herein be designated "produced water".

The C.O.D. (Chemical Oxygen Demand as determined by standard methods) of the waste water stream to be converted will generally range from about 1000 to about 15,000 mg/l. The waste water to be treated is contacted with the acclimated biomass of anaerobic microorganism in the conversion zone, in the absence of added molecular oxygen, at a temperature ranging from about 10 to about 60 degrees C, preferably from about 30 to about 40 degrees C, and a pressure ranging from about 0 to about 5 psig. The waste water stream is contacted with the biomass for a time sufficient to convert (decompose) at least a portion of the organic pollutants to gases such as carbon dioxide and methane. The pH of the conversion zone is, suitably, maintained in the range from about 6 to about 8.

EXAMPLE

An experiment was conducted in the laboratory apparatus shown in the Figure. Referring to the Figure, a biomass 10 of anaerobic microorganisms is contained in anaerobic reactor 1. The anaerobic reactor was seeded with a 50:50 mixture to tap water and anaerobic digestor contents from a sewage treatment plant. The initial feed consisted of 5% produced water in 0.4 wt. % solution of acetic acid (used as a source of nutrient) in tap water. The percentage of produced water was gradually increased to 100% over an 8 week period. The above description corresponds to the acclimatization stage of the present invention. After the acclimatization period, a waste water (produced water) comprising 35,000 mg/l total salts (primarily salts of alkali metals and of Group II A metals) and 0.5 wt. % organic pollutants was introduced into reactor 1 by line 12 to contact the biomass of microorganisms. The temperature of the reaction zone was maintained at about 25 to 30 degrees C and atmospheric pressure. The pH of the reaction zone was maintained between 7.2 to 7.8. The operating conditions of the reaction zone (i.e., biological decomposition zone), the produced water characteristics and the characteristics of the resulting treated produced water are summarized in Table I.

TABLE I

| Operating Parameters: | |
|---|---|
| Hydraulic Retention (HRT), days | 1 |
| Loading, Kg COD/m³/d | 5 |
| Hydraulic Mode | Plug flow (upflow) |
| Packing | plastic flexi-rings 5/8 in. |
| Temperature, °C. | 25–30 |
| pH | 7.2–7.8 |
| Methane generation, L/d | 2.4 |
| Methane concentration in gas, % | 78–87 |
| Organic removal based on methane generation, % | 50 |

| Water Quality Parameters:** | | |
|---|---|---|
| | Feed* | Effluent |
| Oil & Grease | 120–180 | 60 |
| Toxicity (tu) | 40 | 16 |
| Total Organic Carbon (TOC) | 2,200 | 1,000 |
| Organic Acids | 5,100 | 2,200 |
| $NH_3$—N | 40–110 | 45 |
| $pH^3$ (pH units) | 7.3–7.8 | 7.2–7.8 |
| Total Suspended Solids (TSS) | 150–430 | 1,000 |
| Salinity (percent) | 3.6 | 3.6*** |
| Alkali metal component (1) | 12700 | 12700*** |
| Group II A metal component (1) | 156 | 156*** |

*Nitrogen-stripped produced water.
**All concentrations are given in mg/l except where noted.
(1) Calculated as elemental metal.
***Not actually measured.

The effluent of the reactor is removed by line 14 and passed to a liquid-separation zone 2. The gas is removed by line 16. The liquid phase (waste water containing a decreased amount of organic pollutants) is removed by line 18. A portion of the effluent is recycled to reactor 1 by line 20. The treated waste water and the gas separated from the effluent are subsequently analyzed by conventional methods.

What is claimed is:

1. A process for treating waste water separated from crude oil at a production well, said waste water comprising a Group IIA metal component of the Periodic Table of Elements, and an alkali metal component in an amount of at least about 7000 mg/l, calculated as elemental metal, which process comprises: contacting said water, in a contacting zone, in the absence of added molecular oxygen, with an acclimated biomass of anaerobic microorganisms at conditions to convert at least a portion of said organic pollutants to carbon dioxide and methane, wherein said biomass is acclimated by the steps which comprise:
   (a) contacting a biomass of anaerobic microorganisms, in the absence of added molecular oxygen, with a water stream comprising organic pollutants, a Group IIA metal component of the Periodic Table of the Elements, and a low concentration of an alkali metal component; and
   (b) incrementally adding an additional amount of said alkali metal component to said water of step (a) to acclimate said biomass of step (a).

2. The process of claim 1, wherein said Group II A metal component is present in said water in an amount of at least about 50 mg/l, calculated as elemental metal.

3. The process of claim 1, wherein said organic pollutants are present in said water in an amount ranging from about 0.1 to 2.0 wt. %.

4. The process of claim 1, wherein said biomass is acclimated prior to being introduced into said contacting zone.

5. The process of claim 1, wherein said biomass is acclimated in said contacting zone.

6. The process of claim 1, wherein said conversion conditions include a temperature ranging from about 10 to 60 degrees C., and a pH ranging from about 6 to 8.

7. The process of claim 1, wherein, in step (b), an additional amount of said Group II A metal component and of said organic pollutants are also added.

8. The process of claim 1, wherein said water stream of step (a) comprises from about 500 to about 1000 mg/l of said alkali metal component and from about 50 to about 100 mg/l of said Group II A metal component, each being calculated as elemental metal.

9. The process of claim 1, wherein, in step (b), said alkali metal component is added incrementally at a rate of about 500 mg/l to 1000 mg/l, calculated as elemental metal, per day.

10. The process of claim 1, wherein said alkali metal component is present in said water in an amount of about 7000 to 20,000 mg/l, calculated as elemental metal.

11. The process of claim 1, wherein the acclimatization of steps (a) and (b) are conducted over a time period ranging from about 40 to about 80 days.

* * * * *